Patented Oct. 30, 1934

1,978,710

UNITED STATES PATENT OFFICE 1,978,710

PLASTICIZER

Alphons O. Jaeger, Mount Lebanon, Pa., assignor, by mesne assignments, to American Cyanamid & Chemical Corporation, a corporation of Delaware No Drawing. Application September 28, 1929, Serial No. 395,966

1 Claim. (Cl. 106—22)

This invention relates to plasticizers or softeners, and to compositions containing them.

Plastic compositions, such as cellulose ester or ether plastics; phenol aldehyde; aldehyde-amine; urea resins; and many other synthetic resins such as condensation products of polyhydric alcohols and polybasic acids, etc., frequently require a plasticizer or softener to render them less brittle and more easily workable. Plasticizers or softeners are also used in lacquers, imparting the desired flexibility or slow-drying qualities to the films formed therefrom. Many substances have been proposed as plasticizers, one of the principal classes being esters, the high boiling esters of mono- and polycarboxylic acids such as, for example, benzoates, phthalates, maleates, etc.

According to the present invention esters of keto acids or their reduction products and derivatives thereof are used as plasticizers or softeners. A softener or plasticizer depends for its effectiveness not only on its physical characteristics, i. e. melting point, boiling point, hardness, etc., but also on its solvent power for the resins or other plastics with which it is associated. The solvent action is also important in lacquers where the plasticizer must be dissolved in the solvent used. Many of the plasticizers proposed in the past, for example esters of simple acids such as phthalates, have a solubility for certain plastic compounds or, in some compositions, for certain components only. This decreases to some extent their usefulness and requires in many cases a considerably larger amount of plasticizer or does not permit incorporating sufficient plasticizer in the case of some lacquers. The characteristics of the plasticized composition are also imperfect in some cases where components are present for which the plasticizer does not have sufficient affinity.

It is a significant advantage of the present invention that the esters of the keto acids are both esters and ketones and, therefore, possess solvent properties of both of these classes. This is an important factor since many of the plastic compositions, and especially some of the cellulose esters and phenol aldehyde resins, are readily soluble in ketones but show markedly less solubility in esters. With other components the reverse is true. This makes the plasticizers of the present invention of very wide application, particularly with mixed plastics, and products of extraordinarily desirable physical characteristics may be obtained therewith.

While it is an advantage of the present invention that a single ester of a keto acid possesses desirable solvent powers for so many plastic components that it can normally be used as the only plasticizer, the invention is in no sense limited to plastic compositions in which the ester of the keto acid or derivative is the only plasticizer present; on the contrary, many efficient plastic compositions or lacquers may be prepared using a mixture of softeners or plasticizers, one of which is an ester of keto acid or derivative which may be associated with other known plasticizers such as, for example, high boiling esters of acids such as phthalic acid, benzoic acid, maleic acid, and the like. Mixed plasticizers can also be made with other types of compounds such as some of the sulphonamides and other well known substances. Such mixed substances are included in the present invention, and impart to it a great flexibility and wide field of utility.

While plasticizers of the present invention are applicable to all plastic compositions and corresponding lacquers, they are particularly effective with cellulose ester or ether plastics, phenol formaldehyde and phenol furfural resins, polyhydric alcohol-polybasic acid resins, condensation products of urea and formaldehyde, polymerized cumeron and indene resins, casein plastics, polymerized resins from styrol, itaconic acid, etc. and sulfur resins. Compositions containing natural resins such as shellac, copal, dammar, and the like may be effectively plasticized by means of the present invention which is in no sense to be considered limited to plastic compositions of the lacquers prepared by synthetic plastics.

The esters of the present invention are also applicable to the new combined natural and synthetic resins such as, for example, the reaction products of glycerin, phthalic anhydride and a natural resin as, for instance, rosin, congo, copal, dammar, etc. These compound resins have found an important field of usefulness both in plastic compositions and lacquers by reason of the fact that they can be incorporated with cellulose ester plastics more readily than can most synthetic resins. The esters of the keto acids, possessing as they do solvent properties of ketones, are peculiarly effective for plasticizing such composite plastics because of their solvent power for both types of constituents present.

The most important keto acids from which the esters of the present invention are prepared can be obtained readily from the Friedel-Crafts reaction from dibasic acids or anhydrides such as phthalic anhydride, maleic acid, and the like. Representative esters are methyl, ethyl, propyl, butyl, amyl, cyclohexyl, tetrahydrofurfuryl and benzyl benzoyl benzoates or substituted benzoyl benzoates. Similar acids of homologous acids such as toluyl benzoic acids and the like. Esters of naphthoyl benzoic or the hydrogenated naphthoyl benzoic acids are also among the most effective plasticizers falling under the present invention, as are esters of acenaphthoyl benzoic acid and fluorene-carbonyl benzoic acid. The above classes of keto aromatic acids are prepared by the Friedel-Crafts' reaction from phthalic anhydride or substituted phthalic anhydride and the respective hydrocarbons. Another series of keto acids whose esters are included in the present invention may be obtained by the condensation of aliphatic dibasic acids such as maleic acid to form, for example, benzoyl or toluyl, acrylic acid, and the like. Other dibasic acids, both aromatic and aliphatic, may be used to produce the corresponding keto acids.

It should be understood, of course, that the pseudomorphic esters of the keto acids may also be used, for example the pseudomorphic of methyl benzoyl benzoate is 3-methoxy 3-phenyl-phthalide.

The esters used in the present invention, some of which are new chemical compounds and are not claimed in the present invention but constitute the subject matter of the pending application of Alphons O. Jaeger, Serial No. 468,726 filed July 17, 1930, are for the most part low-melting solids or viscous liquids, many being colorless and others being of pale yellow color. Their physical characteristics are extremely favorable. They are all high boiling compounds, many of them not boiling at all at atmospheric pressure without decomposition, and their plasticizing effect is extremely high due to their excellent solvent powers or miscibility with the components of the plastic compositions and lacquers with which they are used. A curious reversal of the ordinary characteristics of homologous esters may be noted in connection with the products used in the present invention. Ordinarily the melting point of an ester will increase with the molecular weight of the alcohol used, but in the case of the keto esters the melting point usually decreases; thus, for example, methyl benzoyl benzoate is a well crystallized solid, whereas butyl and amyl benzoyl benzoates are liquids which do not crystallize under ordinary conditions. Apparently the longer the carbon chain of the aliphatic alcohol the more the compound resembles the alcohol and the less it resembles the acid. This is an important characteristic since in many cases it is much easier to prepare the methyl esters, which esters, with the ordinary acids are frequently inapplicable because of their low boiling point and melting point, may be used where a solid or semi-solid plasticizer is desired.

The esters which have greatest commercial importance for most plastic compositions are those of the lower paraffin alcohols up to amyl alcohol, including mixed esters such as the mixed amyl esters prepared by esterifying the keto acid with an isomeric amyl alcohol obtained from natural gas and known in the trade as "pentasol." The invention is in no sense limited to esters of these alcohols and includes esters of higher aliphatic alcohols, esters of aralkyl alcohols, heterocyclic and alicyclic alcohols and the like. Of course the ester should be one which is not itself a resin and this excludes many of the esters of polyhydric alcohols such as glycerin, which esters are for the most part resins capable of being hardened by heat and which will, therefore, ordinarily not act as plasticizers.

While the esters of the keto acids are the ones usually used in carrying out the present invention, esters of the reduced and/or hydrogenated keto acids, as diaryl methane acids, etc. in which the keto group is reduced to a hydrocarbon chain are important for many purposes.

The invention will be explained in connection with the following specific examples which are merely representative illustrations and which are in no sense intended to limit the invention to the exact details therein set forth.

*Example 1*

85 parts of glycerol phthalate resin, freshly prepared and fairly hard but not infusible, are mixed with 15 parts of methyl benzoylbenzoate, which is a crystalline solid having a melting point of about 50° C. and a boiling point of 350° C. The mixture is heated to 150° C. with vigorous stirring until a homogeneous mixture is obtained. Fillers may be incorporated, if desired, and the product can then be molded under pressure at the usual temperatures to form an infusible product. The product is a well plasticized, easily machinable resin.

*Example 2*

Phenol and formaldehyde are condensed in the usual manner to a product which is capable of being hardened by heat. Preferably, the condensation is carried out in the absence of fixed alkalis, and, after removal of water, 15% of crude methyl naphthoylbenzoate, having a melting point between 90 and 105° C., is incorporated with heating. The plasticized condensation product is then mixed with suitable filler, with or without coloring matter, and molded under heat and pressure. An excellent product is obtained, which, however, is dark colored since the crude methyl naphthoylbenzoate is brownish yellow. This product, of course, is suitable for all purposes where an extremely light color is unnecessary. If a somewhat lighter color is desired, purer naphthoylbenzoate should be used, which is a pale crystalline solid having a melting point between 117 and 120° C.

Instead of using methyl naphthoylbenzoate, methyl chlorbenzoylbenzoate, having a melting point between 108 and 109° C., can be used, or, if desired, a methyl tetrahydronaphthoylbenzoate having a melting point of 75° C. may be substituted. Both of these compounds in the pure state are white crystals and the product is, therefore, suitable for uses where a lighter colored resin is desired.

*Example 3*

A fluid condensation product of phenol and formaldehyde is prepared with or without a solvent, and 20—25% of butyl or mixed amyl benzoylbenzoates (obtained by esterifying benzoylbenzoic acid with "pentasol") is added, forming an enamel or lacquer which spreads well while hot on a clean metal surface and can be baked to harden the resin. A very flexible film is obtained which has excellent covering powers.

Instead of using butyl or amyl benzoylbenzoates alone, they may be mixed in various proportions with diethyl phthalate; preferably, however, the benzoylbenzoate should constitute at least one-third of the plasticizer added, although workable enamels may be obtained with even lower percentages of benzoylbenzoates.

Example 4

A fusible phenol-furfural condensation product is prepared and after removing any water and any free alkali which may be present about 12% of a mixture of methyl benzoylbenzoate and butyl naphthoylbenzoate is homogeneously incorporated, sufficient heat being used to render the whole fluid. The butyl naphthoylbenzoate is a very viscous yellow liquid and the plasticized product is, of course, colored, being suitable for purposes where a colored product is not objectionable. If a very light colored resin is desired, the butyl naphthoylbenzoate may be replaced by decolorized butyl benzoylbenzoate which is a colorless liquid. Fillers may be added, if desired, and the plasticized product, of course, can be hardened in the usual manner.

Example 5

A formaldehyde-urea resin is prepared and while still fusible 3–10% of methyl or butyl benzoyl acrylate is incorporated. The resin is then hardened in the usual manner.

Example 6

A fusible resin prepared by the polymerization or condensation of styrol is homogeneously admixed with 5–10% of butyl or mixed amyl benzoylbenzoates and then hardened in the usual manner.

Example 7

A resin prepared by the condensation or polymerization of itaconic acid is mixed with about 3–8% of a mixture of methyl and butyl benzoylbenzoate, sufficient heat being used to permit thorough incorporation.

Example 8

A nitro-cellulose plastic is mixed with 10–30% of methyl benzoylbenzoate, the product being heated and kneaded to permit thorough incorporation. The composition can be readily molded and takes a high polish.

Instead of using methyl benzoylbenzoate alone, it may be mixed in equal proportions with phthalide, a product of very similar properties being obtained.

Example 9

A cellulose nitrate lacquer is prepared with low boiling solvents, to which 10–20% of butyl benzoylbenzoate is added, care being taken that the butyl benzoylbenzoate is thoroughly decolorized. The lacquer spreads and brushes easily, forming a very flexible and tough film.

Example 10

A cellulose acetate lacquer is prepared with the usual low boiling solvents and 12% of butyl naphthoylbenzoate is added. A light yellow colored lacquer is obtained which can be used as a brush lacquer and gives very smooth, flexible films.

Example 11

A molding composition containing shellac or other natural resins is incorporated with about 25% of methyl benzoylbenzoate or by a mixture of methyl benzoylbenzoate and methyl naphthoylbenzoate, the incorporation being effected with heat and stirring or kneading. The composition can be readily molded and worked, the surface being capable of taking a fine finish.

Example 12

A polymerized cumeron and indene resin is prepared and is mixed with about 10% methyl benzoylbenzoate or a mixture of equal parts of methyl benzoylbenzoate and dibutyl phthalate. The product obtained is readily moldable and has very desirable physical characteristics.

Example 13

A resin is prepared by heating slowly to 230° C. 75 parts of congo, 50 parts of phthalic acid, and 35 parts of glycerol. The condensation product is plasticized with 25 parts of a mixture of methyl benzoylbenzoate and butyl naphthoylbenzoate. After thorough incorporation, suitable fillers are added and the material moulded to an infusible product.

Instead of the above ester resin, a mixture of equal parts of the ester resin and nitrocellulose may be used, the plasticizer being incorporated as described.

What is claimed as new is:

A plasticized composition comprising an organic plastic substance and an ester of benzoyl acrylic acid with a monohydric alcohol.

ALPHONS O. JAEGER.